(12) United States Patent
Funahashi

(10) Patent No.: US 6,572,288 B1
(45) Date of Patent: Jun. 3, 2003

(54) PRINTING SYSTEM AND METHOD OF MANAGING DATA IN THE PRINTING SYSTEM

(75) Inventor: Hiroyuki Funahashi, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 490 days.

(21) Appl. No.: 09/636,812

(22) Filed: Aug. 10, 2000

(30) Foreign Application Priority Data

Aug. 11, 1999 (JP) ............................................. 11-227806

(51) Int. Cl.$^7$ ................................................. B41J 5/30
(52) U.S. Cl. ............................... 400/62; 400/61; 400/76
(58) Field of Search .............................. 400/61, 62, 70, 400/76; 358/1.15

(56) References Cited

U.S. PATENT DOCUMENTS 6,145,031 A * 11/2000 Mastie et al. ................. 710/52
6,348,971 B2 * 2/2002 Owa et al. .................. 358/1.15
6,447,184 B2 * 9/2002 Kimura et al. .............. 400/578
6,476,927 B1 * 11/2002 Schwarz, Jr. .............. 358/1.15

* cited by examiner

*Primary Examiner*—Andrew H. Hirshfeld
*Assistant Examiner*—Minh H. Chau
(74) *Attorney, Agent, or Firm*—Oliff & Berridge, PLC

(57) ABSTRACT

A printing system includes a plurality of networked printers where macro data can be stored efficiently and quickly in selected printers. First, a host computer reads macro data stored in a HDD of a predetermined printer and displays the macro data on a CRT display. Then, upon the user's selection of macro data to be copied and the IP addresses of destination printers, the selected macro data is transmitted to each of the destination printers. Each of the destination printers receives the selected macro data and stores it in its HDD.

25 Claims, 10 Drawing Sheets

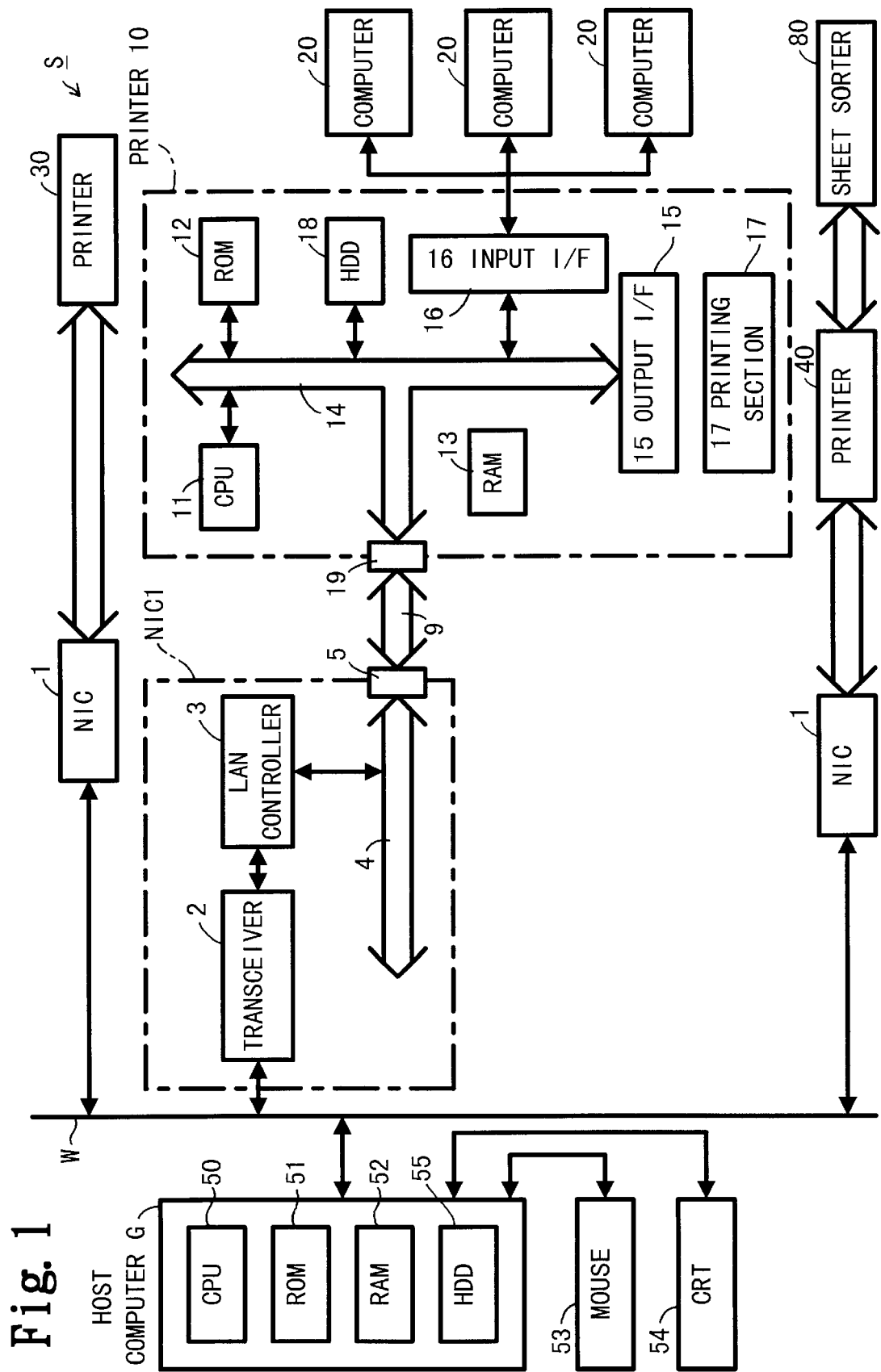

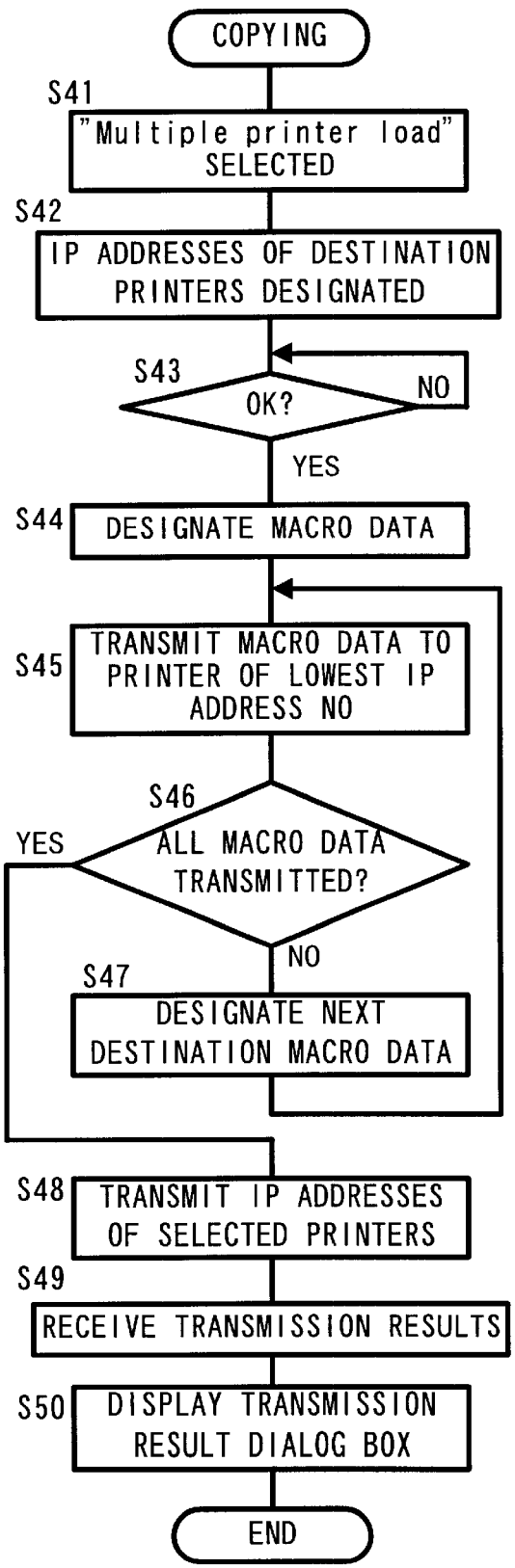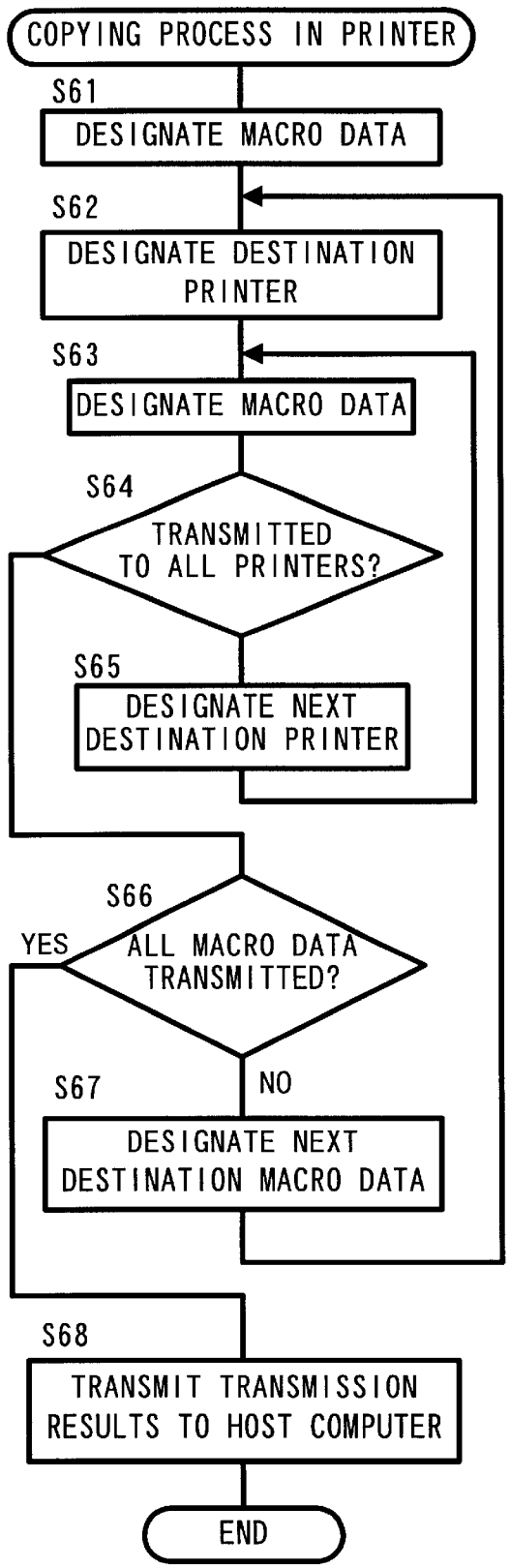

PRINTING SYSTEM AND METHOD OF MANAGING DATA IN THE PRINTING SYSTEM

BACKGROUND OF THE INVENTION

1. Field of Invention

The invention relates to a printing system having a plurality of printers connected to a network and a print control unit that transmits/receives data and commands to/from the plurality of printers over the network.

2. Description of Related Art

In a conventional printing system using a network, a plurality of printers are controlled by a single computer. In such a system, the single computer can intensively manage the operating condition and the faulty condition of each printer. Accordingly, a failed printer can be repaired efficiently, or an unusable printer can be replaced with another printer.

In a printer, macro data can be stored in a memory of the printer. Macro data is data describing a fixed format, such as a letterhead. If such macro data is stored in the memory of the printer, the body of a letter prepared in a computer and transmitted to the printer can be combined with the macro data and outputted as a complete letter. Similarly, if a table format is stored, as macro data, in the memory of the printer, numeric values and character strings to fill the table are transmitted from the computer to the printer, and can be combined with the macro data and outputted as a complete table.

A method typically used for storing macro data in each printer in the above-described networked printing system is that macro data is transmitted from the computer to each printer over the network, and then macro data is stored in each printer. In this method, the same storing process must be repeated separately for each printer. Thus, the more printers that are connected to the network, the more times the same storing task should be repeated. This is time-consuming.

SUMMARY OF THE INVENTION

The invention provides a printing system capable of storing print control data, such as macro data, in a plurality of printers connected to a network efficiently and quickly, thereby solving the above-mentioned problems.

In the printing system of the invention, a print control system designates from among the plurality of printers a plurality of destination printers to which print control data is transmitted, and transmits the print control data sequentially to the designated destination printers. On the other hand, each of the destination printers receives the print control data transmitted from the print control unit, and stores it in its memory. With an entry of a single transmission command into the print control unit, the print control data can be transmitted to the plurality of destination printers and the print control data can be stored in each of the destination printers. Accordingly, the print control data can be stored efficiently.

Further, the print control unit requests an identification code from each of the plurality of printers connected to the network, and displays each of the identification codes transmitted, in reply, from each of the printers. The displayed identification codes allow a user to choose the identification codes and designate the destination printers easily and properly. As a result, user efficiency can be improved.

Further, the print control unit may be designed to display transmission results of the print control data to each of the destination printers. Such display facilitates the user to judge the success or failure of data transmission and to cope with a transmission failure.

Usually, print command data received by a printer is enabled by resetting the printer. In this invention, the print control unit transmits a printer reset command to each of the destination printers. Thus, user efficiency can be improved.

Another method is conceivable for transmitting print control data to each of the destination printers. A print control unit transmits, to one printer selected from the destination printers, the print control data and identification codes of the other destination printers. The selected one printer stores the received print control data in its memory. Further, the selected one printer transmits the print control data to the printers associated with the identification codes, based on the received identification codes of the destination printers. Each of the destination printers receives the print control data and stores it in its memory.

In the above-described control method, the print control unit is required to transmit the print control data to just one selected printer. Then, the selected one printer transmits the print control data to other destination printers. Accordingly, after transmitting the print control data to the one selected printer, the print control unit can proceed to another process, in an efficient manner.

Further, to make full use of the above-described features of the printing system, the above described control steps may be stored in various storage media and be provided as a computer program. A print control unit or a printer into which such a program is installed from a storage medium can be used as the above-described printing system.

BRIEF DESCRIPTION OF THE DRAWINGS

Various exemplary embodiments of the invention will be described in detail with reference to the following figures wherein:

FIG. 1 is a block diagram showing a general configuration of a printing system embodying the invention;

FIGS. 10A and 10B are flowcharts showing a macro data copying process executed in an alternative way.

DETAILED DESCRIPTION OF PREFERRED EMBODIMENTS

Figure 2A:
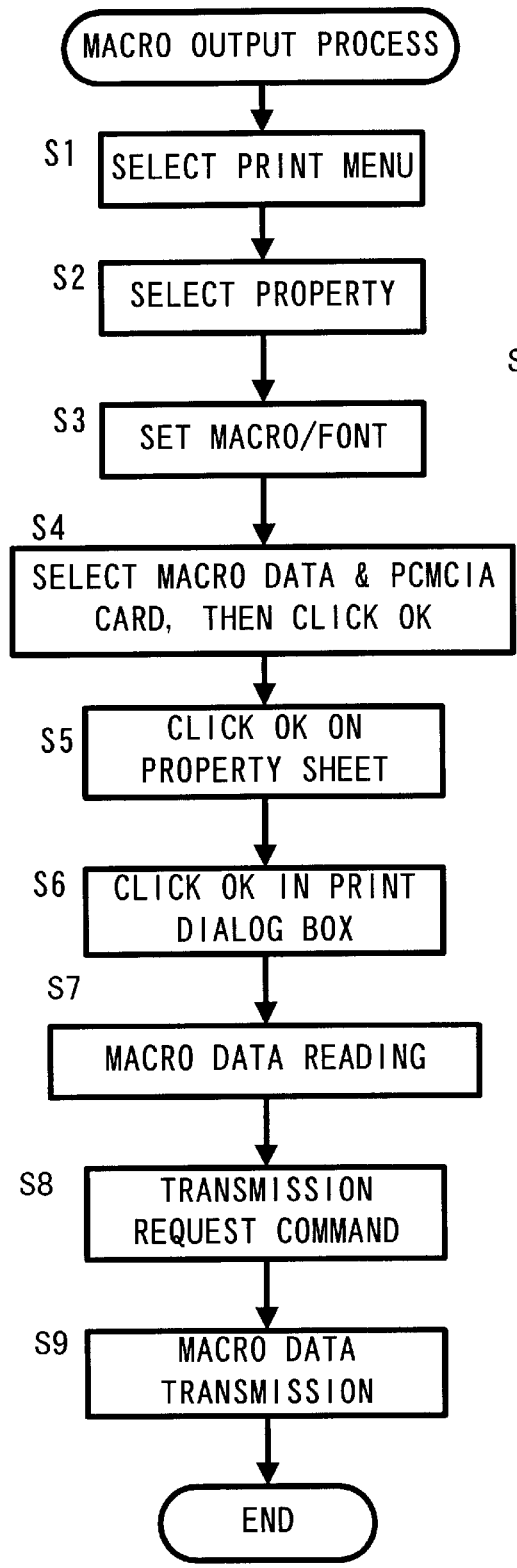
FIGS. 2A and 2B are flowcharts showing a macro data storing process.

A first exemplary embodiment of the invention will be described with reference to the figures. In the first exemplary embodiment, the invention is applied to a printing system where a host computer and printers are connected to a network using the TCP/IP (Transmission Control Protocol/Internet Protocol).

Referring now to FIG. 1, the configuration of the printing system according to the first exemplary embodiment will be described.

As shown in FIG. 1, the printing system S includes a host computer G, a network W, such as a telephone line or a LAN, a plurality of NICs (Network Interface Cards) 1 as interfaces, printers 10, 30, 40, a plurality of computers 20 connected to the printer 10, and a sheet sorter 80 connected in series to the printer 40. The printers 10, 30, 40 are of the same type. Printers other than printers 10, 30, 40 may be connected to the network W of the embodiment.

The host computer G includes a CPU 50, a ROM 51, a RAM 52, and a hard disk drive (HDD) 55, while a mouse 53 and a CRT or LCD display 54 are connected to the host computer G. The general-purpose software for preparing objects to be printed, such as word processing software, spreadsheet software, and drawing software, as well as printer driver software for controlling printers are installed in the HDD 55.

A program for storing macro data and a program for copying macro data are installed in the HDD 55 as part of the printer driver software. These programs are initially recorded in an information recording medium, such as a floppy disk or a CD (Compact Disc). When these programs are installed in the HDD 55, they become ready to be started in the host computer G.

The printer 10 includes a CPU 11, a ROM 12, a RAM 13, a bus 14, an output interface (output I/F) 15, an input interface (input I/F) 16, a printing section 17, and a hard drive disk (HDD) 18. The ROM 12 prestores a program for storing macro data and a program for copying macro data. Although the storing program and the copying program stored in the ROM 12 are different from those stored in the HDD 55, counterpart programs are related to each other. When the storing program stored in the HDD 55 is started and the storing process is executed, the storing program stored in the ROM 12 is also started.

Macro data is stored in the HDD 18 that is detachably attached, as a PCMCIA card, to the printer 10. Also, a NIC 1 is connected to the printer 10 through a connector 19 and a connection line 9. Further, the computer 20 is connected to the printer 10 through the input I/F 16. The printers 30, 40 are configured similarly to the printer 10, but differ from the printer 10 in that they are not connected to the computers 20.

Each NIC 1 includes a transceiver 2 for data transmission/reception, a LAN controller 3, a bus 4, and a connector 5. In this embodiment, an individual IP address is assigned, as identification data, to each NIC 1. When a command is sent from the host computer G by designating the IP addresses, that command can be sent to each of the printers connected to the NICs 1 corresponding to the designated IP addresses.

Figure 4:
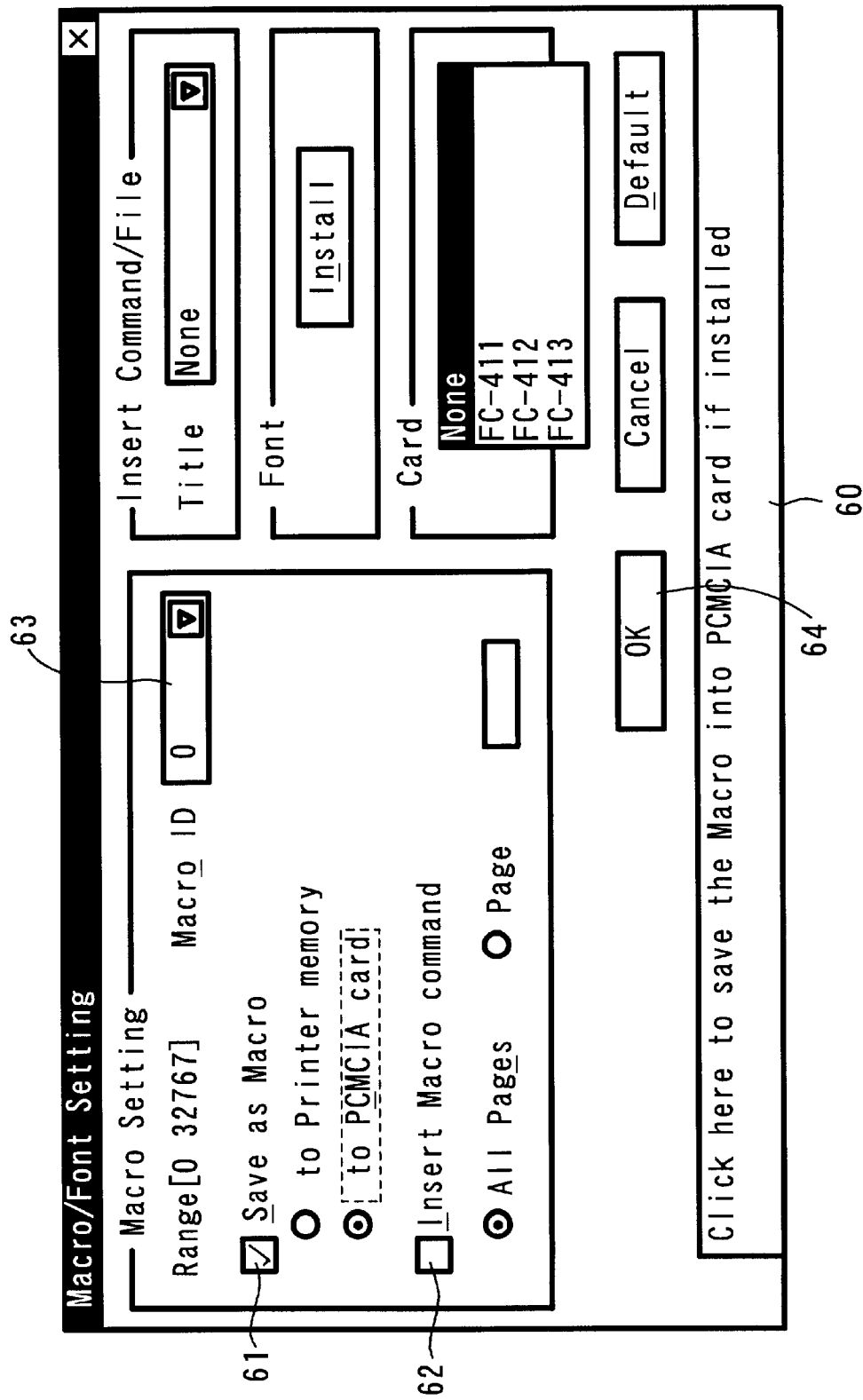
FIG. 4 shows a dialog box for storing macro data.

Referring now to FIGS. 1, 2, and 4, storing and copying processes of macro data in the printing system S will be outlined. Although a description below is made about processes executed between the host computer G and the printer 10 through the NIC 1, similar processes are executed between the host computer G and the printer 30 or 40 through separately provided NIC 1.

Figure 2B:
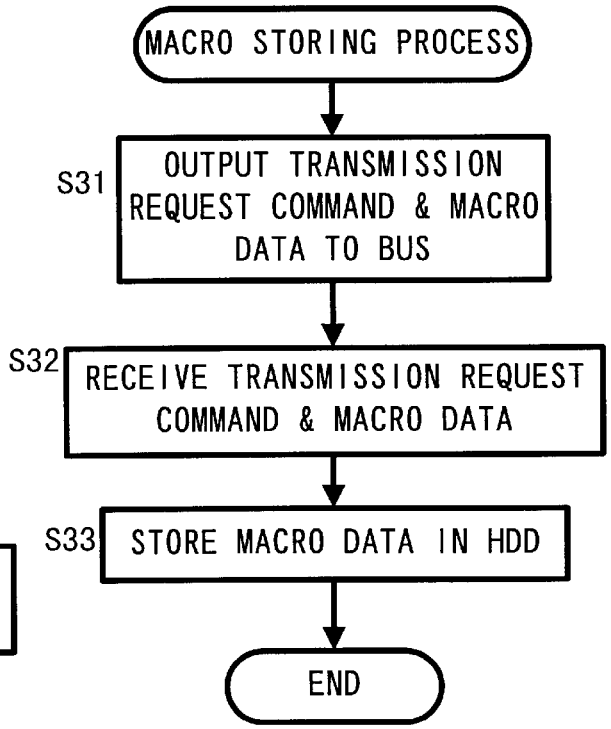

First, a macro data storing process will be described with reference to FIGS. 2A, 2B, and 4. In this process, macro data transmitted from the host computer G is received by the printer 10, and stored in the HDD 18 of the printer 10.

To execute the storing process, an application for activating macro data to be stored (for example, word processing software) should be started on the host computer G by a user. Then, as shown in FIG. 2A, when a print menu is selected by the user (step 1; hereinafter abbreviated as S1), a printing dialog box for setting print conditions and executing a print start command is displayed on the CRT 54 of the host computer G. When a property button provided in the dialog box is pressed (S2), a property sheet is displayed on the CRT display 54. When a macro/font setting button provided in the property sheet is selected (S3), a macro/font setting dialog 60 is displayed on the CRT display 54, as shown in FIG. 4.

In the macro/font setting dialog box, as shown in FIG. 4, a check box 61 for storing macro data is included. To store macro data, it is necessary to check the check box 61 and enter the ID number of the macro data to be stored in the macro ID box 63. Further, by selecting the PCMCIA card as a storage medium and by clicking an OK button 64 (S4), the property sheet is displayed again on the CRT display 54. At this time, the macro data to be stored is specified by the ID number and the PCMCIA card is specified as a storage medium into which the macro data is stored. Then, by clicking an OK button on the property sheet (S5), the printing dialog box is displayed again on the CRT display 54. At this time, when the user confirms that the printer 10 is set as a printer into which the macro data is stored and clicks an OK button on the printing dialog box (S6), storing the macro data into the printer 10 is started.

First, the CPU 50 of the host computer G reads the macro data stored in the HDD 55 according to the entered ID number (S7). Then, the CPU 50 designates the IP address of the printer 10 and transmits a macro data transmission request command to the NIC 1 that is connected to the printer 10 (S8). In addition, the CPU 50 transmits the read macro data, via the same path, to the NIC 1 that is connected to the printer 10 (S9). The LAN controller 3 of the NIC 1 reads the transmission request command through the transceiver 2 and outputs the transmission request command and the macro data to the bus 4 (S31). The CPU 11 of the printer 10 receives the transmission request command through the connector 5, the connection line 9, the connector 19, and the bus 14. Then, the CPU 11 receives the macro data via the same path, based on the transmission request command (S32) and stores the received macro data in the HDD 18 installed as the PCMCIA card in the printer 10 (S33). The storing process is completed when the macro data is stored in the HDD 18 of the printer 10.

In order to execute the macro data stored in the HDD 18 in the above-described manner, the macro/font setting dialog box 60 shown in FIG. 4 should be displayed first. After checking a macro execution check box 62 and entering the ID number of the macro data to be executed in the macro ID box, the OK button 64 should be pressed.

A copying process in which macro data stored in the HDD 18 of the printer 10 is copied to another printer will now be described.

To execute the copying process, an application called card monitor software should be started on the host computer G by the user. By the use of this application software, the contents of the HDD 18 installed in the printer 10 can be displayed.

When the user starts the card monitor software and designates the printer 10, the CPU 50 of the host computer G designates the IP address (10.154.54.27) of the printer 10 and transmits, to the network W, a command for referring to the contents of the macro data-storing directory in HDD 18. In turn, the LAN controller 3 of the NIC 1 installed in the printer 10 receives that command through the receiver 2 and outputs that command to the bus 4.

Then, when the CPU 11 of the printer 10 receives that command through the connector 5, the connection line 9, the connector 19, and the bus 14, the CPU 11 outputs, to the bus 14, the contents of the macro data-storing directory and a command for transmitting that contents. Then, when the LAN controller 3 receives the transmitted command and the contents of the macro data-storing directory through the connector 19, the connection line 9, the connector 5, and the bus 4, the LAN controller 3 designates the IP address of the host computer G and transmits the transmitted command and the contents of the macro data-storing directory to the network W through the transceiver 2.

Figure 5:
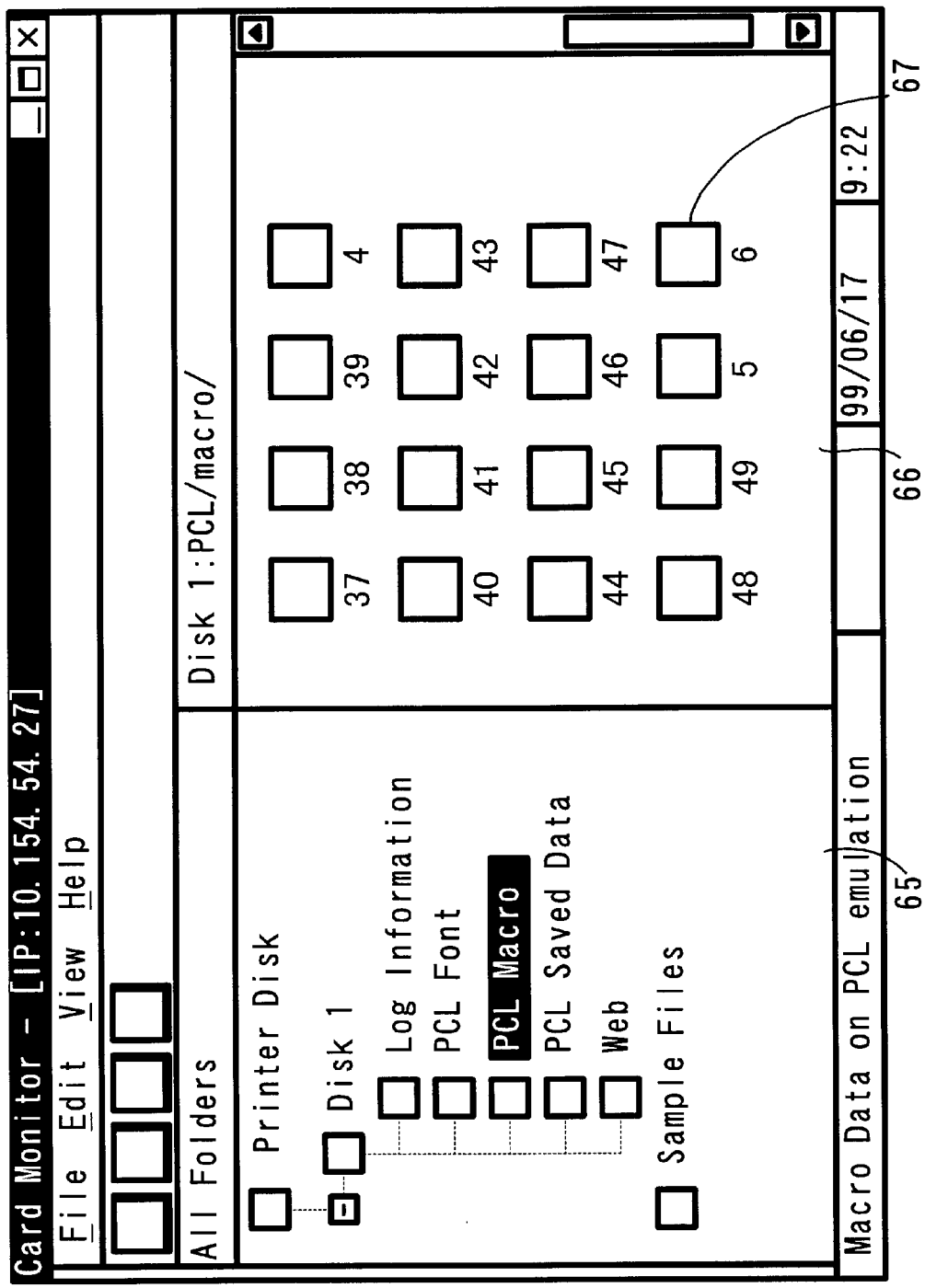
FIG. 5 shows a list of macro data sets.

In turn, the CPU 50 of the host computer G receives the contents of the macro data-storing directory and displays the contents on the CRT display 54, as shown in FIG. 5. As shown in FIG. 5, macro data sets are displayed using icons in a data display area 66. The macro ID number is added at the bottom of each icon 67. In addition, the types of data displayed in the data display area 66 are displayed in a directory area 65. The character string representing the type of data currently displayed in the data display area 66 is distinguishably displayed in reverse video.

Figure 6:
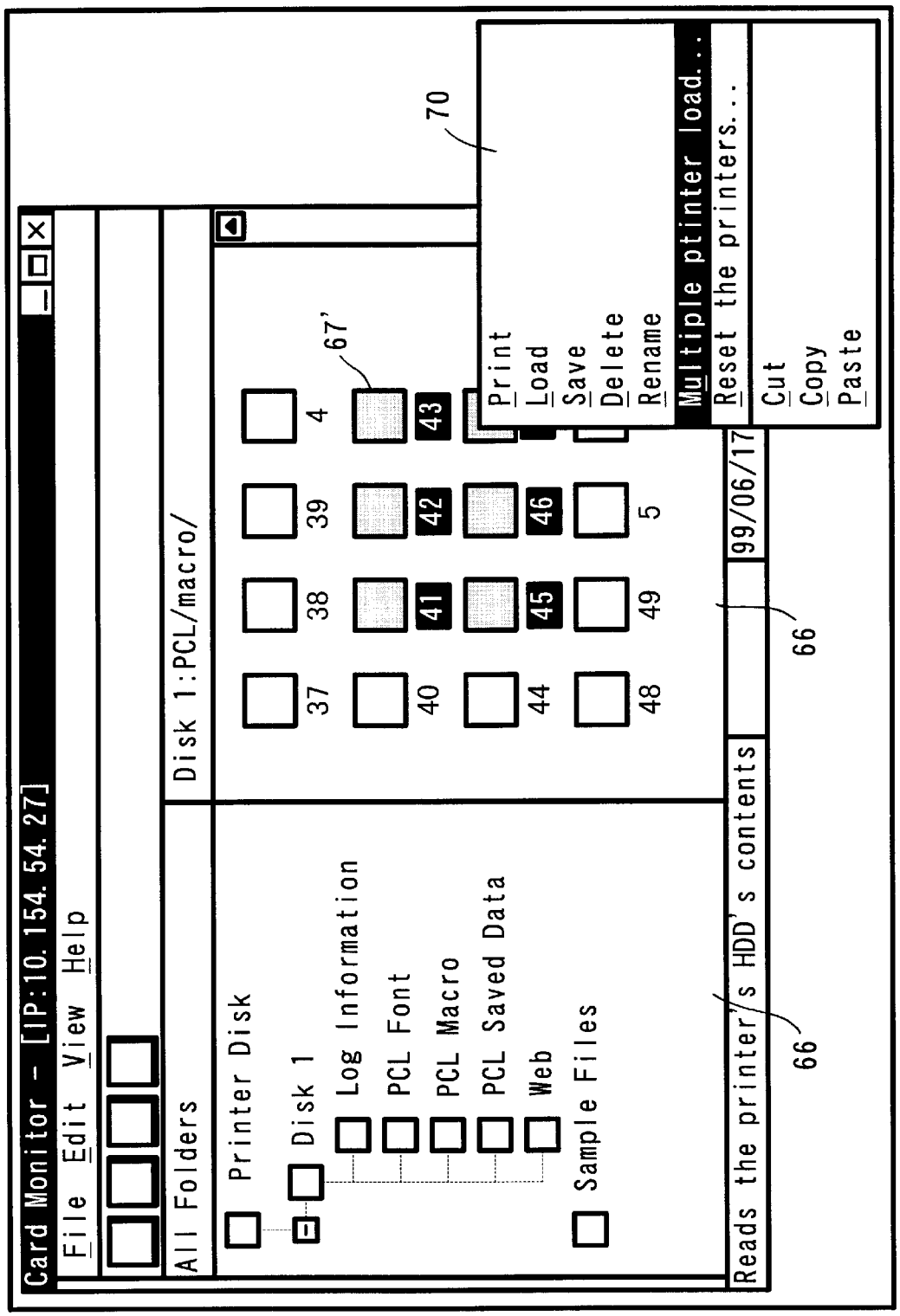
FIG. 6 shows a state where desired macro data sets have been selected.

Then, the user operates the mouse 53 to select the macro data to be copied. FIG. 6 shows a state where the user has selected the macro data sets. In FIG. 6, icons 67' displayed in reverse video indicate the selected icons. In FIG. 6, the macro data sets of ID numbers 41, 42, 43, 45, 46, and 47 are selected. The copying process starts from this state. The details of the process will be described with reference to a flowchart shown in FIG. 3.

Figure 7:
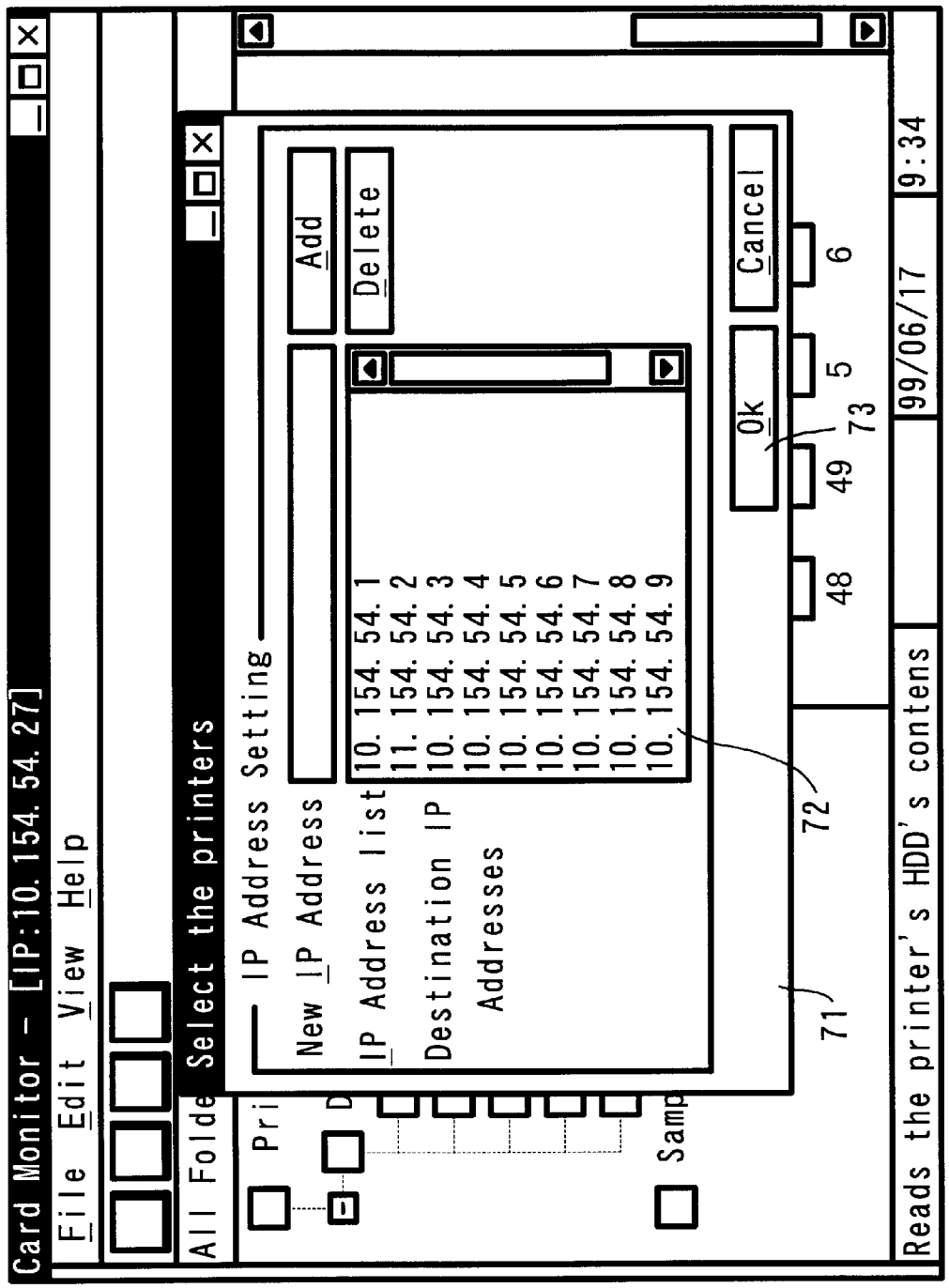
FIG. 7 shows a dialog box for selecting a printer.

First, the user operates the mouse 53 to display a command menu 70 shown in FIG. 6. When the user selects a "Multiple printer load" command (S11), the CPU 50 of the host computer G transmits, to the network W, a command for reading the IP address of each printer. In turn, each NIC 1 separately connected to each printer replies the IP address assigned to the NIC 1 to the network W. As the NICs 1 are in a one-to-one correspondence with the printers, the IP address assigned to a particular NIC can be considered the IP address of the corresponding printer. Then, the CPU 50 of the host computer G reads the returned IP addresses. Then, the CPU 50 displays a printer selection dialog box 71, as shown in FIG. 7. In a list display area 72 of the printer selection dialog box 71, IP addresses of all the printers connected to the network W are displayed.

Figure 8:
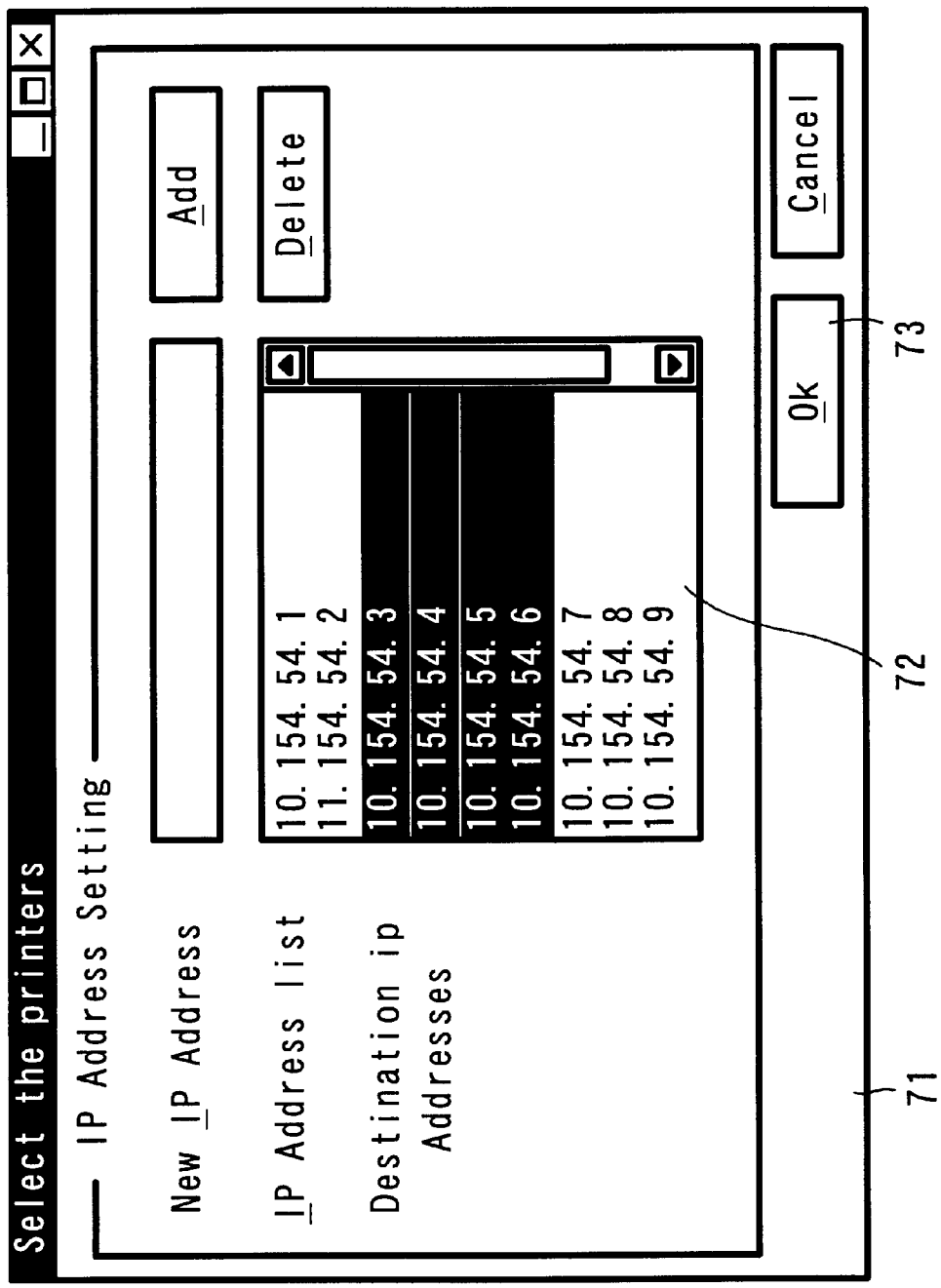
FIG. 8 is a state where printers have been selected.

Then, the user operates the mouse 53 to select IP addresses of the printers, as destination addresses to which the macro data is transmitted, from a list of IP addresses displayed in the list display area 72 of the printer selection dialog box 71 (S12). The CPU 50 of the host computer G displays the selected IP addresses in reverse video, as shown in FIG. 8. In FIG. 8, printers of IP addresses "10.154.54.3", "10.154.54.4", "10.154.54.5", and "10.154.54.6" are selected.

When the user operates the mouse 53 and clicks the OK button 73 in the printer selection dialog box 71 (S13), the CPU 50 of the host computer G transmits the macro data sets selected as shown in FIG. 6 and a copy command including a command to copy the macro data, over the network W, to the printers of the IP addresses selected in S12. Macro data transmission is executed for each printer, sequentially. In addition, when a plurality of macro data sets are selected, each macro data set is transmitted sequentially.

More specifically, in this embodiment, the macro data of ID number 41 is transmitted first to the printers of IP addresses "10.154.54.3", "10.154.54.4", "10.154.54.5", and "10.154.54.6", sequentially. Then, the macro data of ID number 42 is transmitted to the printers of IP addresses "10.154.54.3", "10.154.54.4", "10.154.54.5", and "10.154.54.6", sequentially. Likewise, the macro data of ID address 43, the macro data of ID address 45, the macro data of ID address 46, and the macro data of ID address 47 are transmitted to each printer, in this order.

Figure 3:
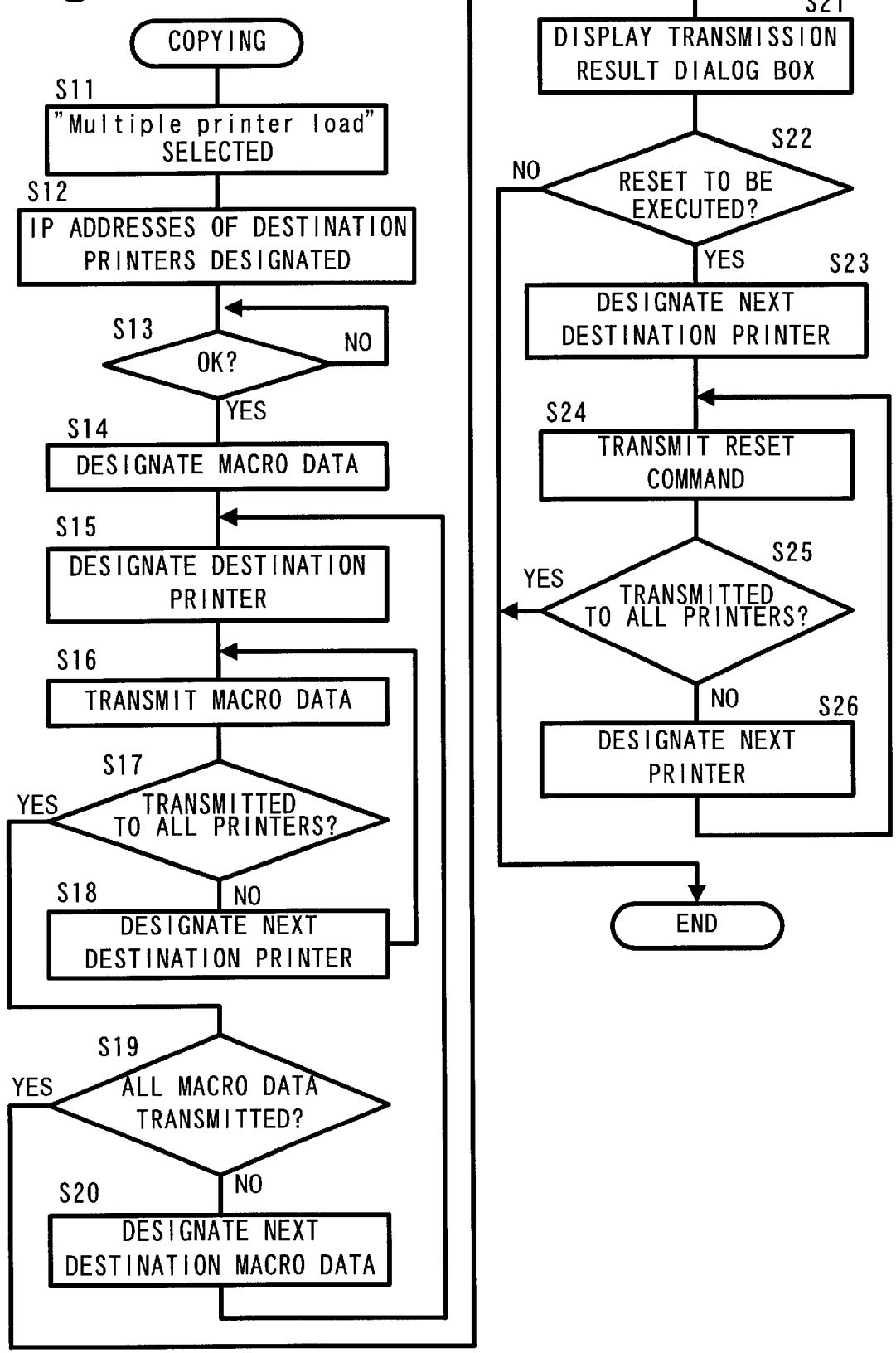
FIGS. 3A and 3B are flowcharts showing a macro data copying process.

As shown in the flowchart of FIG. 3, the CPU 50 of the host computer G designates the macro data to be transmitted first (S14). In this embodiment, the macro data of ID number 41 is designated. Then, the printer to which the macro data is sent first is designated (S15). In this embodiment, the printer of IP address "10.154.54.3" is designated. After that, the CPU 50 transmits the macro data designated in S14 and a copy command to the printer designated in S15 (S16).

The designated printer, upon receipt of the copy command, receives the designated macro data and stores the designated macro data in its HDD 18 installed in the printer.

Each time the macro data transmission (S16) to the designated printer is completed, the CPU 50 of the host computer G determines whether the macro data designated in S14 has been transmitted to all the printers selected in S12 (S17). When the macro data of ID address 41 has been transmitted to the printer of IP address "10.154.54.3", the CPU 50 makes a negative determination. Thus, in S18, the CPU 50 designates the printer to which the macro data is transmitted next, that is, the printer of IP address "10.154.54.4". Then, the CPU 50 returns to S16, where the CPU 50 transmits the macro data of ID number 41 to the printer of IP address "10.154.54.4".

In this way, the macro data of ID number 41 is transmitted to each printer, repeatedly. When the CPU has made an affirmative determination in S17, that is, when the macro data of ID number 41 has been transmitted to the printer of IP address "10.154.54.6", the CPU 50 determines, in S19, whether transmission of all the selected macro data sets is completed. When the macro data of ID number 41 has been transmitted, all the selected macro data sets have not been transmitted yet, and thus the CPU 50 makes a negative determination. Then, in S20, the CPU 50 designates the ID number of the macro data to be transmitted next. In this embodiment, the CPU 50 designates ID number 42 and returns to S15.

In S15, the CPU 50 designates the printer of IP address "10.154.54.3" and transmits the macro data of ID number 42 to the designated printer (S16).

Figure 9:
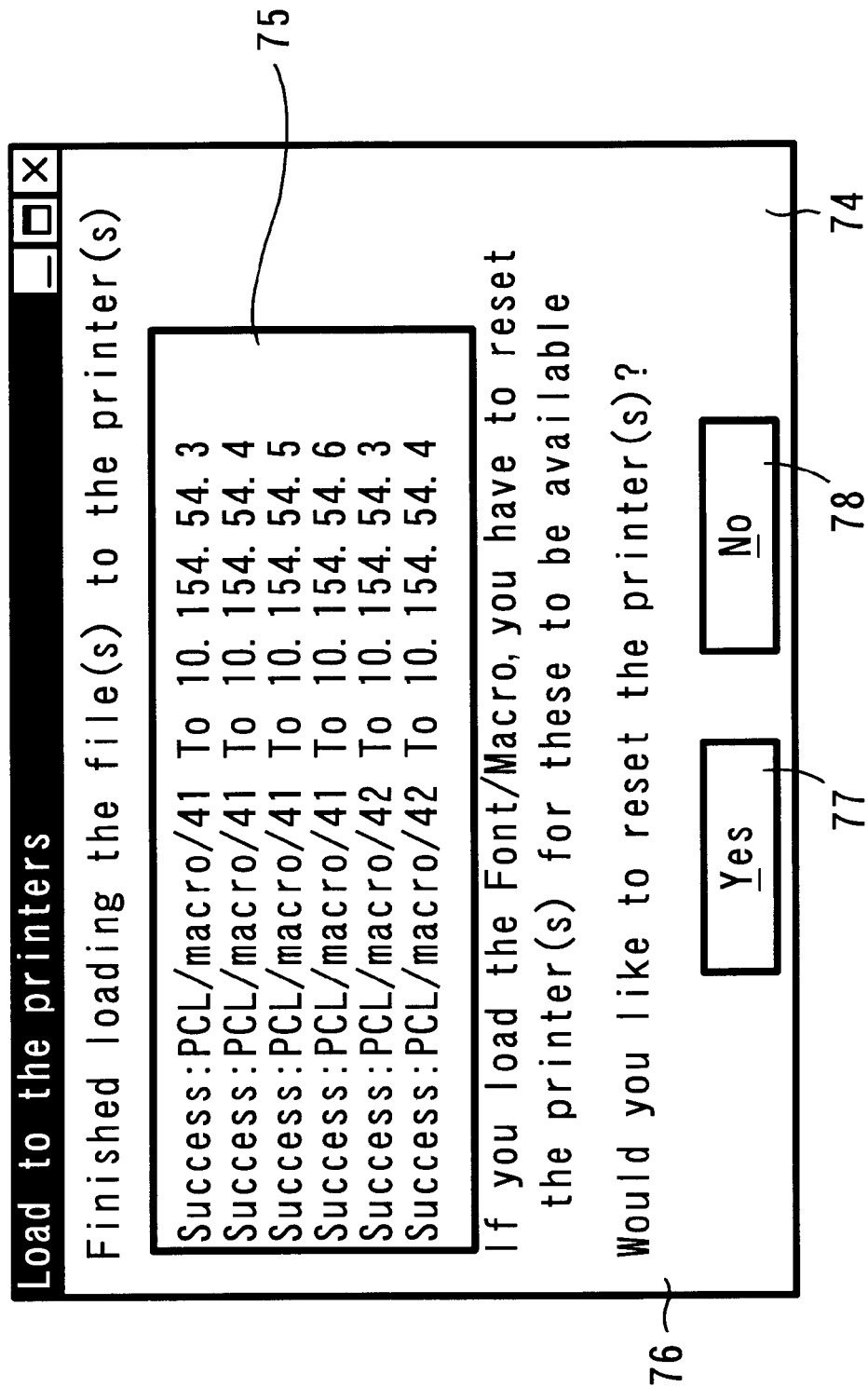
FIG. 9 is a dialog box showing transmission results for each printer.

When the macro data sets of all the selected ID numbers have been transmitted to the printers of all the selected IP addresses (S19: YES), the CPU 50 of the host computer G displays a transmission result indicating dialog box 74 (S21), as shown in FIG. 9. In an exemplary case shown in FIG. 9, "Success" is displayed at the left end of a result display area 75 to indicate that the selected macro data has been transmitted to the selected printer successfully. When macro data transmission is failed in any printer, "Failure" is displayed instead of "Success".

In FIG. 9, "Success" is displayed for all the macro data sets to indicate that transmission of all the macro data has been completed successfully. When a transmission failure occurs, only the macro data and the destination printer should be designated again to attempt transmission again.

After the CPU 50 of the host computer G displays dialog box 74, it is brought into a standby state where the CPU 50 waits for a user-selection entry as to whether or not to reset the printer to which transmission is successfully completed (S22). It is necessary to reset (restart) each printer in order to enable the macro data copied to each printer. However, resetting a printer during printing may be harmful to the printer. Thus, in this printing system, whether or not to reset the printer is left to the user's judgment. As shown in FIG. 9, a question 76 as to whether or not to reset the printer is posed in the dialog box 74. When the user does not desire to reset the printer, the mouse 53 should be operated to click a No button 78 in the dialog box 74. Thereby, the CPU 50 of the host computer G determines that no printer reset has been triggered (S22: No), and completes the macro data copying process.

On the other hand, when the user desires to reset the printer, the mouse 53 should be operated to click a Yes button 77 in the dialog box 74. Thereby, the CPU 50 of the host computer G determines that a printer reset has been triggered (S22: Yes), and selects the printer to which a reset command is transmitted first. More specifically, in this embodiment, the printer of IP address "10.154.54.3" is selected (S23) first, and then, the reset command is transmitted to the selected printer (S24).

The selected printer, upon receipt of the reset command, resets itself.

The CPU 50 of the host computer G determines whether a reset command is transmitted to all the printers selected in S12 (S25). When the reset command has been transmitted to only the printer of IP address "10.153.54.3", the reset command has not been transmitted yet to all the printers. Thus, the CPU 50 makes a negative determination in S25, and designates the printer to which the reset command is transmitted next (S26). In this embodiment, the printer of IP address "10.154.54.4" is designated. Then, the CPU 50 returns to S24, where the CPU 50 transmits the reset command to the printer designated in S26, and makes a determination in S25.

In this way, when the CPU 50 determines that the reset command has been transmitted to all the printers (S25: YES), it completes the copying process.

As described above, in this embodiment where a plurality of printers are connected to the network W, single transmission of a copy command from the host computer G allows a plurality of macro data sets to be copied to a plurality of printers. Accordingly, the efficiency of the printing system can be improved.

In addition, as destination printers can be selected using the IP addresses, this printing system provides excellent usability.

Although, in the above-described embodiment, macro data stored in the HDD 18 of the printer 10 is copied by the host computer G to the HDDs of other printers, macro data prepared by the host computer G can be copied to a plurality of printers, in the similar manner.

A second embodiment of the invention will now be described. In the second embodiment, macro data transmission is executed in the same printing system S as in the first embodiment, but using a different method from the first embodiment.

To be more specific, in the first embodiment, macro data is transmitted from the host computer G to each of the selected printers. In the second embodiment, selected macro data and the corresponding ID numbers, IP addresses of selected printers, and a copying command are transmitted from the host computer G to one of the selected printers. Then, the selected macro data is transmitted and copied from one of the selected printers to other selected printers.

This process will now be described with reference to flowcharts shown in FIGS. 10A and 10B.

As shown in FIG. 6, while designating the ID numbers of the macro data sets desired to be copied, the user operates the mouse 53 to display the command menu 70. When the user selects the "Multiple printer load" command (S41), the CPU 50 of the host computer G transmits to the network W a command for reading the IP address of each printer. In turn, each NIC 1 separately connected to each printer replies the IP address to the network W, and the CPU 50 of the host computer G reads the returned IP addresses. Then, the CPU 50 displays the printer selection dialog box 71, as shown in FIG. 7. In the list display area 72 of the printer selection dialog box 71, IP addresses of all the printers connected to the network W are displayed.

Then, the user operates the mouse 53 to select IP addresses of the printers, as destination addresses to which the macro data is transmitted, from a list of IP addresses displayed in the list display area 72 of the printer selection dialog box 71 (S42). The CPU 50 of the host computer G displays the selected IP addresses in reverse video, as shown in FIG. 8. In FIG. 8, printers of IP addresses "10.154.54.3", "10.154.54.4", "10.154.54.5", and "10.154.54.6" are selected.

Then, when the user operates the mouse 53 and clicks the OK button 73 in the printer selection dialog box 71 (S43), the CPU 50 of the host computer G transmits all the macro data sets selected as shown in FIG. 6, the IP addresses of the destination printers, and a copy command including a command to copy the macro data, over the network W, to one of the selected printers in S42. In this embodiment, the printer of the lowest IP address number, that is "10.154.54.3" is designated as one of the selected printers.

The CPU 50 of the host computer G designates the macro data to be transmitted first (S44). In this embodiment, the macro data of ID number 41 is designated. Then, the macro data designated in S44 and a copy command are transmitted to the printer of IP address "10.154.54.3" (S45). The printer of IP address "10.154.54.3", upon receipt of the macro data, stores it in its HDD 18.

In S46, the CPU 50 of the host computer G determines whether transmission of all the selected macro data sets has been completed. When the macro data of ID number 41 has been transmitted, all the macro data sets have not been transmitted yet, and thus the CPU 50 makes a negative determination. Then, in S47, the CPU 50 determines the ID number of the macro data to be transmitted next. In this embodiment, the CPU designates ID number 42 and returns to S45.

Then, in S45, the CPU 50 transmits the macro data of ID number 42 to the printer of IP address of "10.154.54.3".

In this way, when transmission of all the selected macro data sets has been completed (S46: Yes), the IP addresses of the printers selected in S42 are transmitted to the printer of IP address "10.154.54.3" (S48). The printer of IP address "10.154.54.3" stores the received IP addresses in its HDD 18.

Then, the printer of IP address "10.154.54.3" transmits all the selected macro data sets to each of the printers designated as the destination printers. This process will be described with reference to a flowchart shown in FIG. 10B.

The CPU 11 of the printer of IP address "10.154.54.3" designates the macro data to be transmitted first from among the macro data sets previously transmitted from the host computer G. In this embodiment, the CPU 11 designates the macro data of ID number 41 (S61). Then, the CPU 11 designates the destination printer to which the macro data is transmitted, using the destination IP addresses stored in the HDD 18 (S62). In this embodiment, the CPU 11 designates the printer of IP address "10.154.54.4". Then, the CPU 11 transmits the macro data designated in S61 to the printer designated in S62 (S63).

The designated printer, upon receipt of the designated macro data, stores the designated macro data in its HDD 18.

Each time the macro data transmission (S63) to the designated printer is completed, the CPU 11 of the printer of IP address "10.154.54.3" determines whether the macro data designated in S61 has been transmitted to all the printers of destination IP addresses stored in the HDD 18 (S64). When the macro data of ID address 41 has been transmitted to the printer of IP address "10.154.54.4", the CPU 11 makes a negative determination. Thus, in S65, the CPU 11 designates the printer to which the macro data is transmitted next, that is, the printer of IP address "10.154.54.5". Then, the CPU 11 returns to S63, where the CPU 11 transmits the macro data of ID number 41 to the printer of IP address "10.154.54.5".

In this way, when the macro data of ID number 41 is transmitted to each printer repeatedly, that is when the macro data of ID number 41 has been transmitted to the printer of IP address "10.154.54.6", the CPU 11 makes an affirmative determination in S64. Then, the CPU 11 determines, in S66, whether transmission of all the macro data sets transmitted from the host computer G and stored in the HDD 18 of the printer of IP address "10.154.54.3" has been completed. When the macro data of ID number 41 has been transmitted, all the selected macro data sets have not been transmitted yet, and thus the CPU 11 makes a negative determination. Then, in S67, the CPU 11 designates the ID number of the macro data to be transmitted next. In this embodiment, the CPU 11 designates ID number 42 and returns to S62.

In S62, the CPU 11 designates again the printer of IP address "10.154.54.4" and transmits the macro data of ID number 42 to the designated printer (S63).

In this way, when all the macro data sets having the selected ID numbers and stored in the HDD 18 of the printer of IP address "10.154.54.3" have been transmitted to all the printers having the IP addresses stored in the HDD 18 (S66: YES), the CPU 11 transmits a result of transmission to each printer to the host computer G (S68). The result of transmission to each printer may be stored in a RAM of the printer of IP address "10.154.54.3".

When the host computer G receives the transmission results from the printer of IP address "10.154.54.3" (S49), the CPU 50 of the host computer G displays the transmission result dialog box, as shown in FIG. 9, based on the received transmission results (S50).

With regard to the printer reset executed in the first embodiment, whether or not to reset a printer may be determined prior to the macro data transmission from the host computer G to the printer of IP address "10.154.54.3", in the second embodiment. When a printer reset is determined to be executed, the procedure from S23 through S26 of FIG. 3 are executed after S68.

Although, in the above-described embodiments, destination printers are designated by selecting IP addresses, they may be designated by selecting printer names. In this case, a CPU of a host computer may be designed to select the IP addresses associated with the printer names. Alternatively, destination printers may be set using URLs (uniform resource locators).

Although, in the above-described embodiments, macro data is copied as an example, print control data other than the macro data may be copied. For example, font data, instead of macro data, may be copied in the same manner. Further, besides the print control data, print data and Web display data for displaying the printer status may be copied in the same manner as with the macro data.

When print data is copied, print data may be copied page by page by displaying print data of each page in a thumb-nail view.

It should be understood that the foregoing description of the exemplary embodiments is only illustrative of the invention. Various alternatives and modifications can be devised by those skilled in the art without departing from the invention.

The processes executed in the above-described embodiments are realized by computer programs. Such programs are stored in various removable media, such as a floppy disk, a compact disc, and an EPROM, which are installed in a host computer and a printer as needed. Such programs may also be downloaded from a Web site.

What is claimed is:

1. A printing system, comprising:
   a print control unit and a plurality of printers that are connected to a network,
   wherein the print control unit comprises:
      means for designating, from among the plurality of printers, a plurality of destination printers to which print control data is transmitted; and
      means for transmitting the print control data sequentially to the plurality of destination printers, and
   wherein each of the plurality of printers comprises:
      means for receiving the print control data transmitted from the print control unit; and
      means for storing the received print control data in a memory.

2. The printing system according to claim 1,
   wherein the print control unit further comprises:
      means for requesting an identification code from each of the plurality of printers;
      means for receiving each of the identification codes transmitted from each of the plurality of printers;
      means for displaying each of the received identification codes; and
      means for selecting the destination printers based on each of the displayed identification codes, wherein each of the plurality of printers further comprises means for transmitting its own identification code to the print control unit in response to an identification code request transmitted from the print control unit.

3. The printing system according to claim 1, wherein the print control unit further comprises means for displaying transmission results of the print control data to the plurality of destination printers.

4. The printing system according to claim 1, wherein the print control unit further comprises means for transmitting a printer reset command to each of the plurality of destination printers upon completion of transmission of the print control data to the plurality of destination printers.

5. The printing system according to claim 1, wherein the print control unit transmits the print control data stored in one of the plurality of printers to other printers.

6. A printing system, comprising:
   a print control unit and a plurality of printers that are connected to a network,
   wherein the print control unit comprises:
      means for designating, from among the plurality of printers, a plurality of destination printers to which print control data is transmitted;
      means for designating the print control data to be transmitted;
      means for selecting one printer from among the plurality of destination printers; and
      means for transmitting, to the selected one printer, identification codes of other destination printers and the print control data, and wherein the selected one printer comprises:
  means for receiving the print control data and the identification codes of the other destination printers;
  means for storing the received print control data in a memory; and
  means for transmitting the received print control data to the other destination printers, and
wherein each of the other destination printers comprises:
  means for receiving the print control data transmitted from the selected one printer; and
  means for storing the received print control data in a memory.

7. The printing system according to claim 6,
wherein the print control unit further comprises:
  means for requesting an identification code from each of the plurality of printers;
  means for receiving the identification codes transmitted from each of the plurality of printers;
  means for displaying each of the received identification codes; and
  means for selecting the destination printers based on each of the displayed identification codes, wherein each of the plurality of printers further comprises means for transmitting its own identification code to the print control unit in response to an identification code request transmitted from the print control unit.

8. The printing system according to claim 6,
wherein the selected one printer further comprises means for transmitting, to the print control unit, transmission results of the print control data to the other destination printers, and
the print control unit further comprises:
  means for receiving the transmission results transmitted from the selected one printer; and
  means for displaying the received transmission results.

9. A method for managing data in a printing system, including a print control unit and a plurality of printers that are connected to a network, comprising:
  designating, from among the plurality of printers, a plurality of destination printers to which print control data is transmitted;
  transmitting the print control data sequentially to the plurality of destination printers;
  receiving the print control data transmitted from the print control unit in each of the destination printers; and
  storing the received print control data in a memory in each of the destination printers.

10. The method according to claim 9, further comprising:
  requesting an identification code from each of the plurality of printers;
  receiving each of the identification codes transmitted from each of the plurality of printers in the print control unit;
  displaying each of the received identification codes;
  selecting the destination printers based on each of the displayed identification codes; and
  transmitting each identification code to the print control unit in response to an identification code request transmitted from the print control unit.

11. The method according to claim 9, further comprising:
  displaying transmission results of the print control data to the plurality of destination printers.

12. The method according to claim 9, further comprising:
  transmitting a printer reset command to each of the plurality of destination printers upon completion of transmission of the print control data to the plurality of destination printers.

13. The method according to claim 9, wherein the print control unit transmits the print control data stored in one of the plurality of printers to other printers.

14. A method for managing data in a printing system, including, a print control unit and a plurality of printers that are connected to a network, comprising:
  designating, from among the plurality of printers, a plurality of destination printers to which print control data is transmitted;
  designating the print control data to be transmitted;
  selecting one printer from among the plurality of destination printers;
  transmitting, to the selected one printer, identification codes of other destination printers and the print control data;
  receiving the print control data and the identification codes of the other destination printers in the selected one printer;
  storing the received print control data in a memory in the selected one printer;
  transmitting the received print control data to the other destination printers;
  receiving the print control data transmitted from the selected one printer in the other destination printers; and
  storing the received print control data in a memory in each of the other destination printers.

15. The method according to claim 14, further comprising:
  requesting an identification code from each of the plurality of printers;
  receiving each of the identification codes transmitted from each of the plurality of printers in the print control unit;
  displaying each of the received identification codes;
  selecting the destination printers based on each of the displayed identification codes; and
  transmitting each identification code from each of the plurality of printers to the print control unit in response to an identification code request transmitted from the print control unit.

16. The method according to claim 14, further comprising:
  transmitting, from the selected one printer to the print control unit, transmission results of the print control data to the other destination printers;
  receiving the transmission results transmitted from the selected one printer in the print control unit; and
  displaying the received transmission results.

17. A memory medium containing routines for managing data in a printing system, including a print control unit and a plurality of printers that are connected to a network, comprising:
  a routine for designating, from among the plurality of printers, a plurality of destination printers to which print control data is transmitted;
  a routine for transmitting the print control data sequentially to the plurality of destination printers;
  a routine for receiving the print control data transmitted from the print control unit in each of the destination printers; and
  a routine for storing the received print control data in a memory in each of the destination printers.

18. The memory medium according to claim 17, further comprising:
a routine for requesting an identification code from each of the plurality of printers;
a routine for receiving each of the identification codes transmitted from each of the plurality of printers in the print control unit;
a routine for displaying each of the received identification codes;
a routine for selecting the destination printers based on each of the displayed identification codes; and
a routine for transmitting each identification code to the print control unit in response to an identification code request transmitted from the print control unit.

19. The memory medium according to claim 17, further comprising:
a routine for displaying transmission results of the print control data to the plurality of destination printers.

20. The memory medium according to claim 17, further comprising:
a routine for transmitting a printer reset command to each of the plurality of destination printers upon completion of transmission of the print control data to the plurality of destination printers.

21. The memory medium according to claim 17, wherein the print control unit transmits the print control data stored in one of the plurality of printers to other printers.

22. A memory medium containing routines for managing data in a printing system including, a print control unit and a plurality of printers that are connected to a network, comprising:
a routine for designating, from among the plurality of printers, a plurality of destination printers to which print control data is transmitted;
a routine for designating the print control data to be transmitted;
a routine for selecting one printer from among the plurality of destination printers;
a routine for transmitting, to the selected one printer, identification codes of other destination printers and the print control data;
a routine for receiving the print control data and the identification codes of the other destination printers in the selected one printer;
a routine for storing the received print control data in a memory in the selected one printer;
a routine for transmitting the received print control data to the other destination printers;
a routine for receiving the print control data transmitted from the selected one printer in the other destination printers; and
a routine for storing the received print control data in a memory in each of the other destination printers.

23. The memory medium according to claim 22, further comprising:
a routine for requesting an identification code from each of the plurality of printers;
a routine for receiving each of the identification codes transmitted from each of the plurality of printers in the print control unit;
a routine for displaying each of the received identification codes;
a routine for selecting the destination printers based on each of the displayed identification codes; and
a routine for transmitting each identification code from each of the plurality of printers to the print control unit in response to an identification code request transmitted from the print control unit.

24. The memory medium according to claim 22, further comprising:
a routine for transmitting, from the selected one printer to the print control unit, transmission results of the print control data to the other destination printers;
a routine for receiving the transmission results transmitted from the selected one printer in the print control unit; and
a routine for displaying the received transmission results.

25. A printing system, comprising:
a print control unit and a plurality of printers that are connected to a network,
wherein the print control unit comprises:
means for designating, from among the plurality of printers, a plurality of destination printers to which print control data is transmitted; and
means for transmitting the print control data to at least one of a selected destination printer,
wherein each of the plurality of printers comprises:
means for receiving the print control data; and
means for storing the received print control data in a memory, and
wherein at least one of the print control unit and the selected destination printer comprises:
means for transmitting the print control data sequentially to the plurality of destination printers.

* * * * *